April 28, 1942.    A. BRADY    2,281,227
METHOD OF MAKING A FACE CAST
Filed July 27, 1940
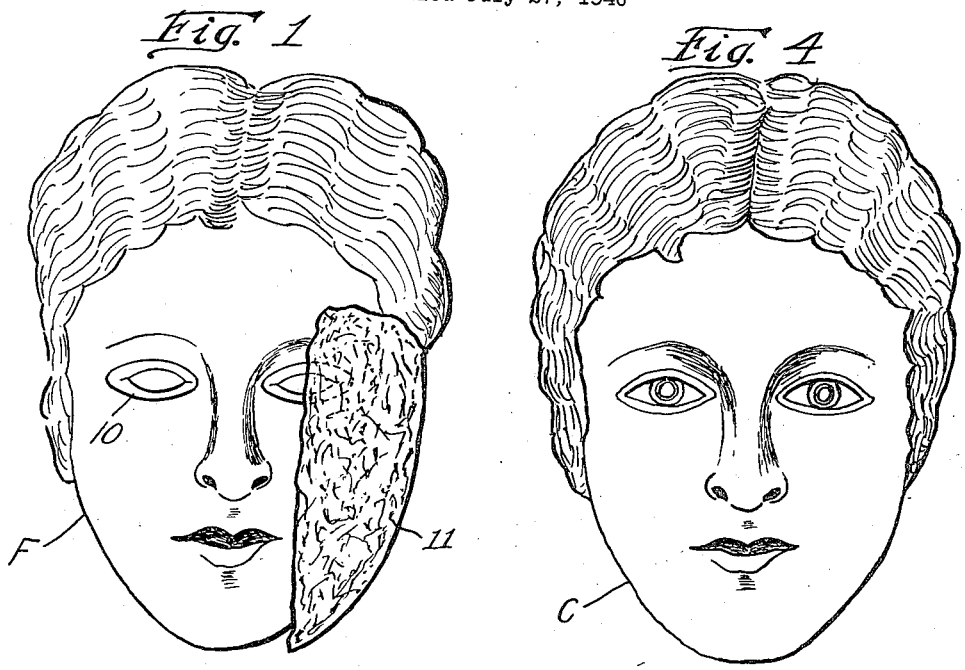
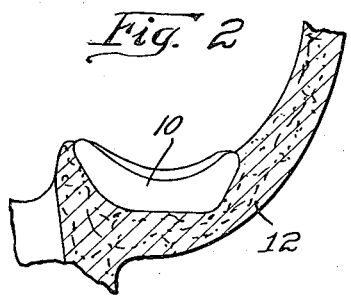
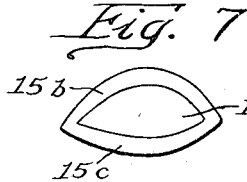
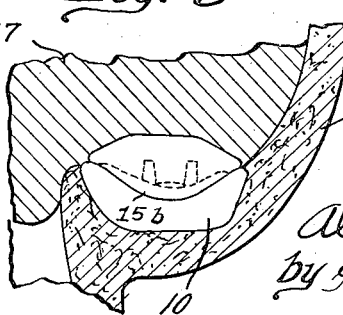
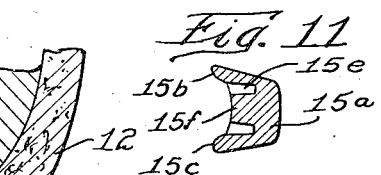
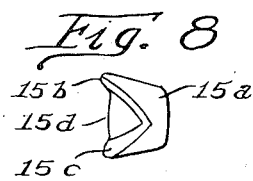
Inventor
Alexander Brady
by Harold E. Cole
Attorney Patented Apr. 28, 1942

2,281,227

UNITED STATES PATENT OFFICE 2,281,227

METHOD OF MAKING FACE CASTS

Alexander Brady, Newton, Mass.

Application July 27, 1940, Serial No. 347,878

3 Claims. (Cl. 18—55)

This invention relates to a method of making a cast of a face, and to an artificial eye member used therein.

The principal object of my invention is to provide the finished cast or reproduction of a face with an eye member therein that has the appearance of and truly represents the open eye. To accomplish this I have provided an eye member and eye cover of the construction disclosed, and have also provided a method of making the finished cast that utilizes said eye member. Said eye cover and eye member, as well as my said method, are inexpensive and simple to use. Furthermore, said method provides protection and comfort for the eyes of the person on whose face the mask is being formed.

Heretofore the common way of providing a finished face cast with a representation of the open eye was to make a hole in the face cast and then to separately fashion an open eye member of clay which is later inserted in place in the hole in said cast. This is expensive and slow work, requiring great skill, all of which my invention obviates, while still accomplishing the desired results more efficiently.

The foregoing and other objects which will appear as the nature of the invention is better understood, may be accomplished by a construction, combination and arrangement of parts and method of use, such as is disclosed by the drawing and specification. The nature of the invention is such as to render it susceptible to various changes and modifications, and, therefore, I am not to be limited to said disclosures; but am entitled to all such changes therefrom as fall within the scope of my claims. In the drawing:

Figure 1 is a front elevational view of the face of a subject from which the finished cast is to be made, showing the eye covers in place on the closed eyelids and showing part of the plastic material, from which the face mask is made, already deposited thereon.

Figure 2 is a partial sectional view of the formed face mask or mold, showing a said eye cover forming an integral part thereof.

Figure 3 is a partial sectional view of the finished cast being made from said mold, showing my eye member seated on a said eye cover that forms a part of the face mold.

Figure 4 is a front elevational view of the finished cast made in accordance with my method.

Figure 5 is a plan view of my eye cover, and Figure 6 is a side elevational view thereof.

Figure 7 is a plan view of my open eye member without the pupil and iris formed therein, and which could be cast from the eye cover shown in Figure 5.

Figure 8 is a side elevational view of said eye member.

Figure 9 is a plan view of my eye member that represents a finished, open eye. Figure 10 is a sectional view taken on the line 10—10 of Figure 9, and Figure 11 is a sectional view taken on the line 11—11 of Figure 9.

As illustrated, to make a reproduction or cast of a face F I first cover the closed eyes of the person, living or dead, who is my subject, with eye covers 10 which fit on the closed eyelids and protect them. The surface of said eye covers that rests on the eyelids consists of an outer rim or depressed portion 10a and a main eyelid portion 10b which projects beyond said outer rim 10a, both of which are formed in the main body 10c of said eye cover 10. Said eye cover 10 and other parts that I make are made of dental plaster, plaster of Paris, graded plastic marble, or other suitable material, which I shall hereafter term plastic material. It is intended that a considerable number of them shall be kept on hand, and the one that is selected will be of a size and shape to fit on the eyelids of the subject. Said eye cover outer rim 10a also provides a seat for the eye member 15 later described.

While said eye covers 10 are on the closed eyelids of my subject I place said plastic material 11 in the usual manner on the face of my subject, including said eye covers, and leave said material 11 on there until it has hardened and set in the usual manner. Then the resultant face mask or mold 12 is taken off, with said eye covers 10 permanently set therein to form an integral part thereof.

Next I select a previously formed eye member 15 that is a mate of the said eye cover 10. Said eye member 15 is made of said plastic material and is already formed, being selected from among many to truly represent the actual eye of my subject. It consists of a main body 15a, an upper lid 15b, a lower lid 15c, an eyeball portion 15d, and has a recess 15e representing the iris. It also has a pupil member 15f that extends from a point integral with said main body 15a outwardly, projecting into and being surrounded by said recess 15e. This pupil member 15f extends outwardly substantially as far as said eyeball portion 15d, both of which are set back of said upper and lower lids 15b and 15c, so that the latter will project beyond the other parts of the eye, as they do in the actual open eye. This eye member 15 can be made by forming it from said eye cover 10 which will serve as a mold, such an eye member being illustrated in Figure 7 of the drawing. Then said iris recess 15c may be fashioned out of it, as well as said pupil member 15f.

This eye member 15 is placed on said eye cover 10 with the extending lids 15b and 15c fitting into said eye cover outer rim 10a. Said plastic material is deposited on the said face mask or mold 12 in the usual manner and on said eye member 15 as well, and when it has hardened and set the finished article or cast 17 is separated from said mold 12, with said eye member an integral part of said cast 17, thus making a reproduction of the face of my subject with an open eye, which gives it a more lifelike appearance.

Before placing the plastic material on the subject's face, and also on said face mold 12, a layer of some suitable grease is preferably placed on said face and on said mold, and also on said eye cover 10, as is commonly done in work of this kind, to facilitate the removal of the hardened plastic material. A piece of fabric may also be placed over said grease as a further aid in removing said cast 17 and said mold 12.

What I claim is:

1. The method of making a cast of a face of a subject comprising placing eye covers on the eyelids of the said subject, depositing plastic material on said face and eye covers and leaving it there until it has set, removing the resultant mask with said eye covers integral therewith, placing eye members on said eye covers, depositing plastic material on the face features of said mask and on said eye members and leaving it there until it has set, and removing the resultant cast with said eye members integral therewith.

2. The method of making a cast of a face of a subject, comprising placing eye covers having depressed outer rim portions on the closed eyelids of the said subject, depositing plastic material on said face and eye covers and leaving it there until it has set, removing the resultant mask, with said eye covers integral therewith, placing eye members having projecting lid portions on said eye covers with said lid portions seating in said eye cover outer rim portions, depositing plastic material on the face features of said mask and on said eye members and leaving it there until it has set, and removing the resulant cast with said eye members integral therewith.

3. The method of making a cast of a face of a subject, comprising placing eye covers having depressed outer rim portions on the enclosed eyelids of the said subject with said outer rim portions resting on said eyelids, depositing plastic material on said face and eye covers and leaving it there until it can be removed as a unit with said eye covers integral therewith, removing the resultant mask, placing eye members having projecting lid portions and pupil members on said eye covers with said lid portions seating in said eye cover outer rim portions and said pupil members pointing towards said eye covers, depositing plastic material on the face features of said mask and on said eye members and leaivng it there until it can be removed as a unit with said eye members integral therewith.

ALEXANDER BRADY.